Oct. 4, 1927.
F. V. MILLER ET AL
1,644,025
AUTO TOP
Filed June 11, 1923    5 Sheets-Sheet 1
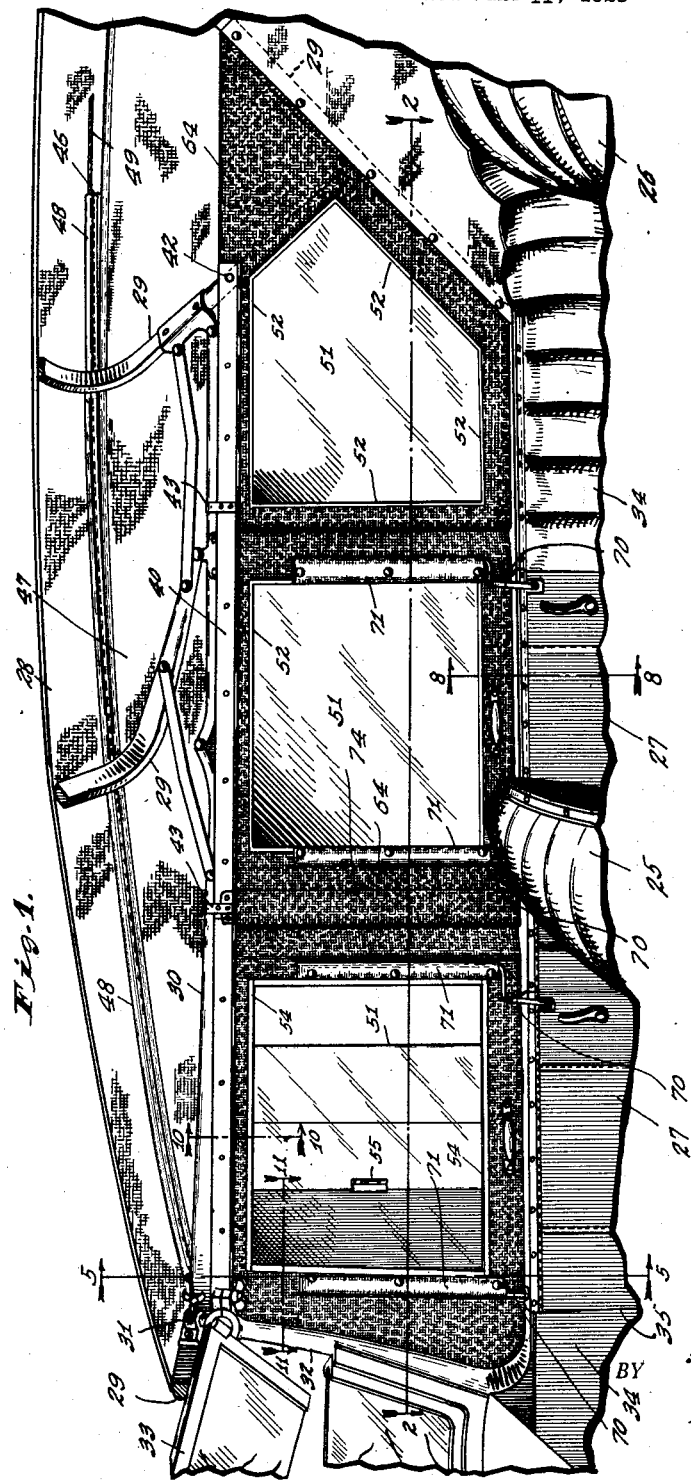
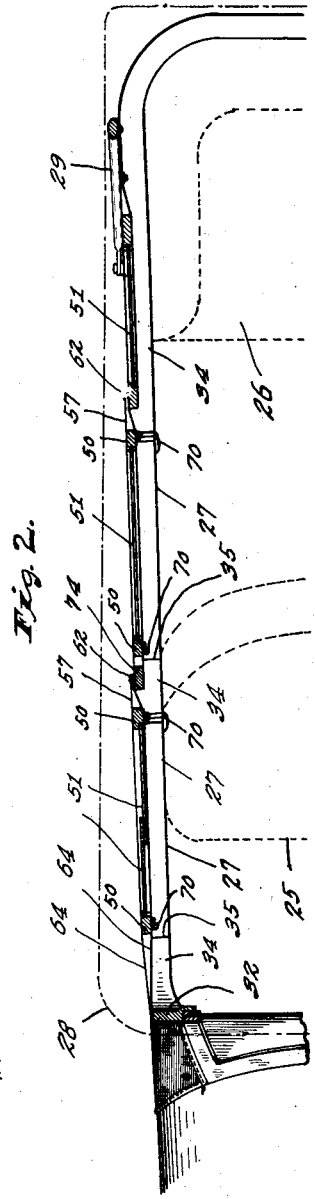
INVENTORS
Frederick V. Miller
Frank M. Crawford,
BY
G. B. Schley
ATTORNEY.

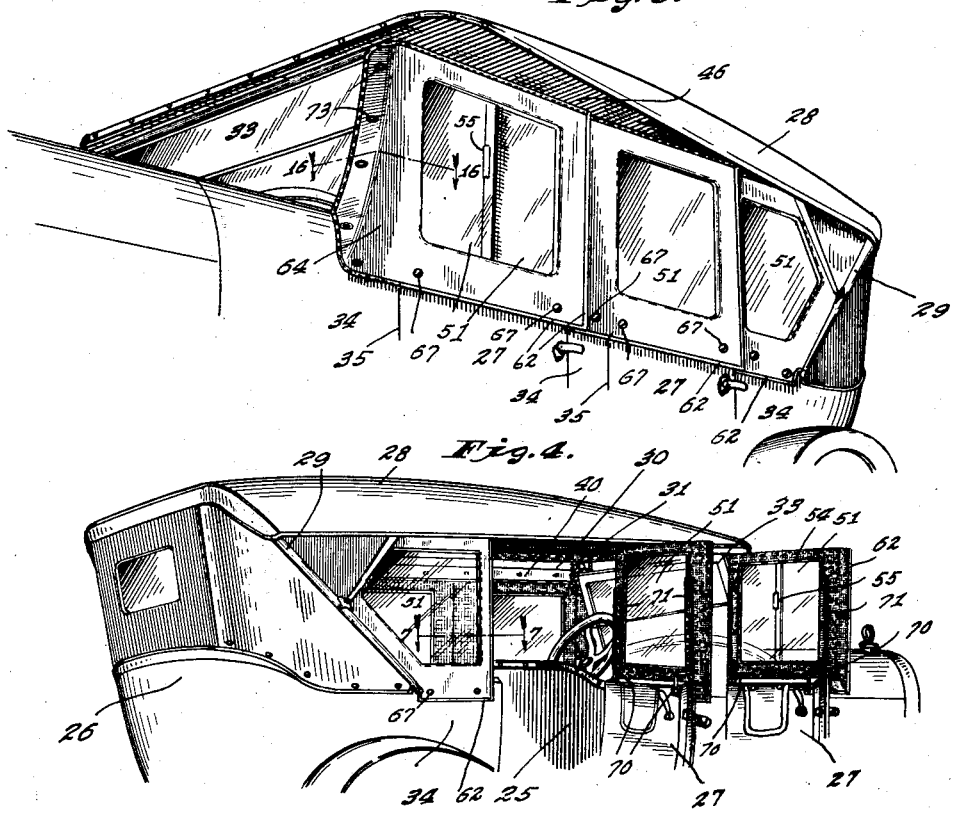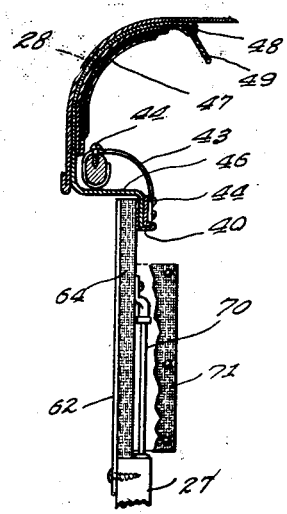

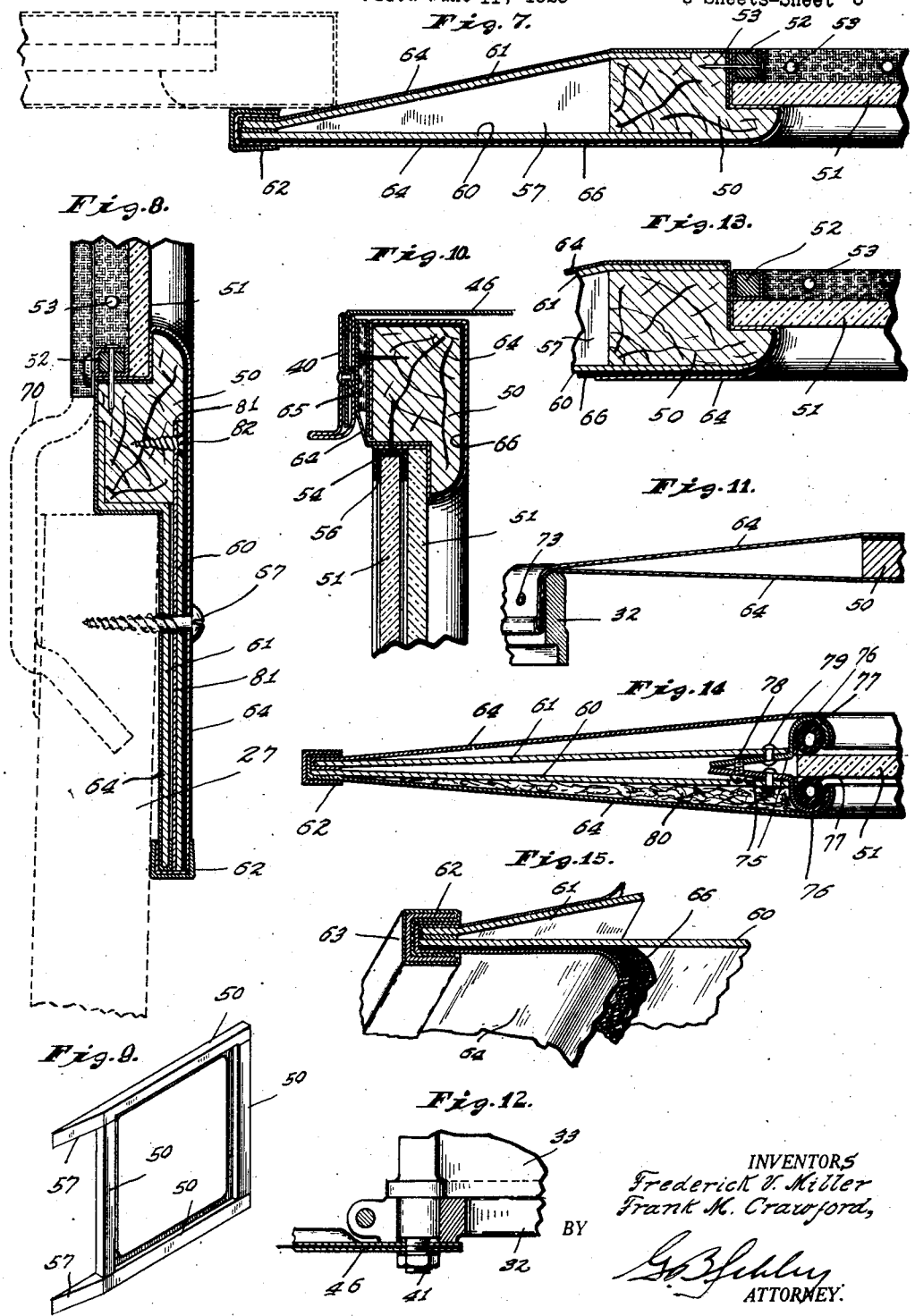

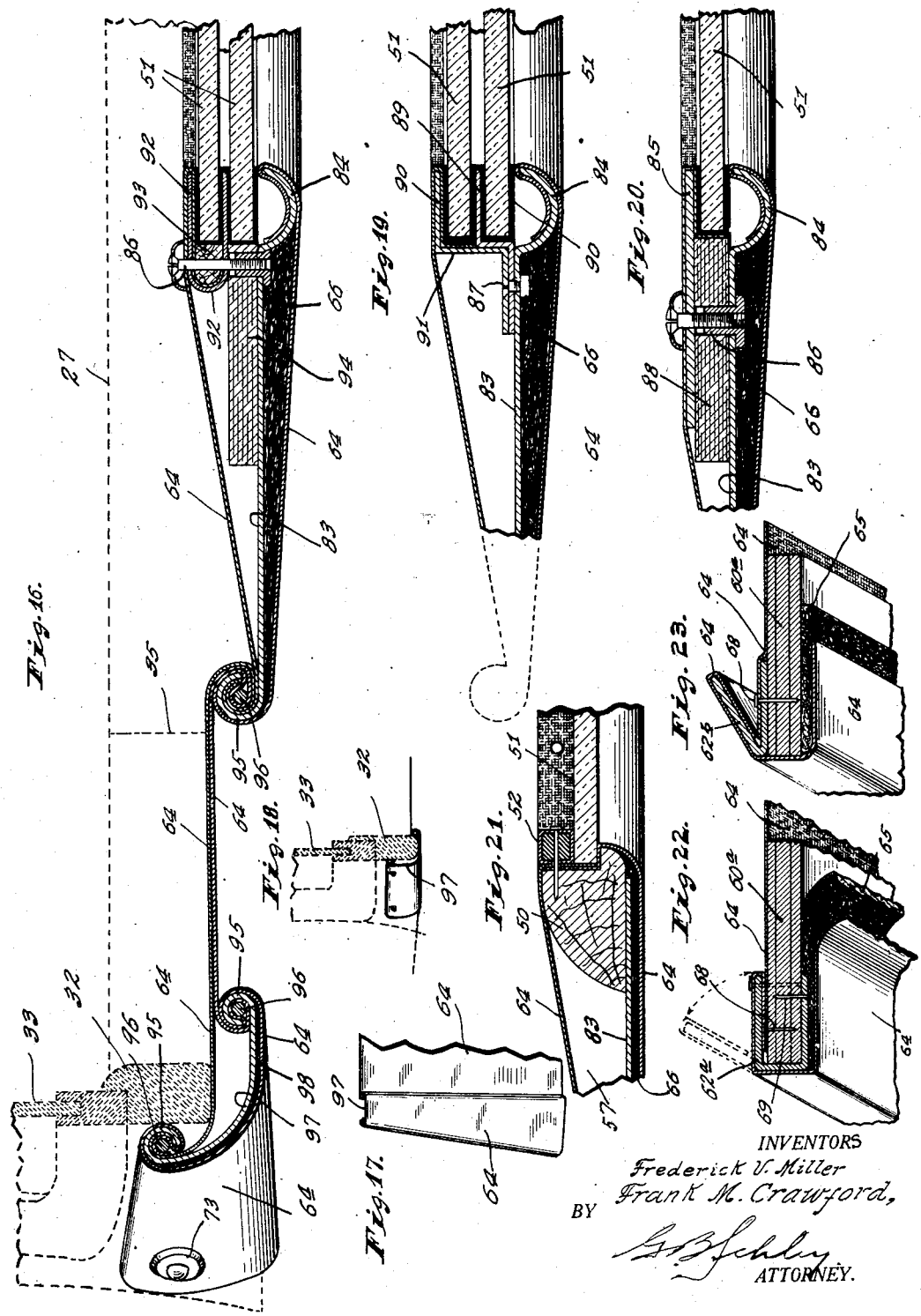

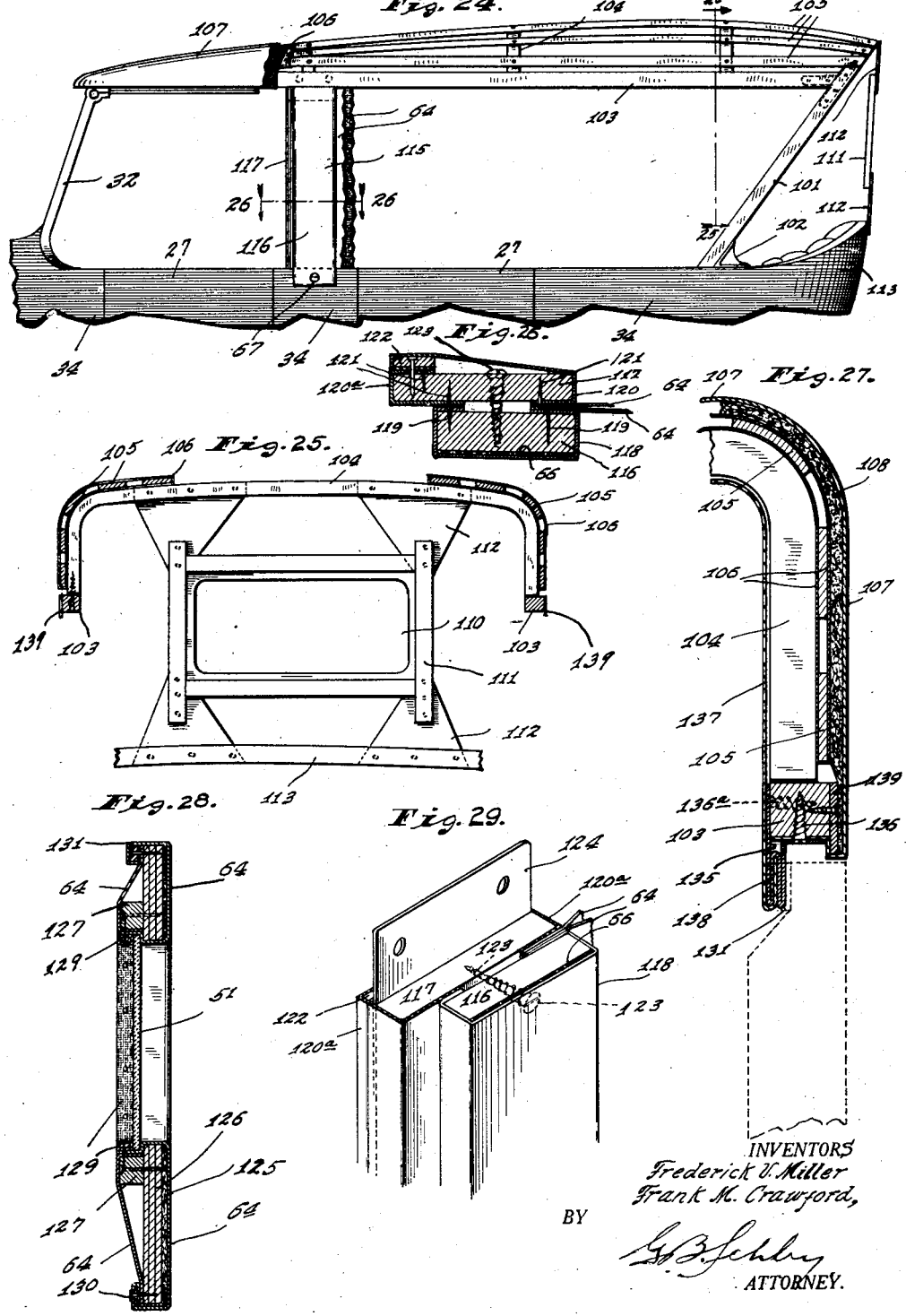

Patented Oct. 4, 1927.

1,644,025

UNITED STATES PATENT OFFICE.

FREDERICK V. MILLER AND FRANK M. CRAWFORD, OF CONNERSVILLE, INDIANA, ASSIGNORS TO REX MANUFACTURING COMPANY, OF CONNERSVILLE, INDIANA, A CORPORATION OF INDIANA.

AUTO TOP.

Application filed June 11, 1923. Serial No. 644,586.

It is the object of our invention to produce inexpensively an effective and sightly closed top and side-curtain construction for the open-body type of automobiles, which can be used efficiently with glass windows throughout, whether they are fixed or movable. Speaking generally, it is our object to make an effective but relatively inexpensive winter top and side-curtain construction, with a cape top as the basis if desired though we prefer a special top, so that the advantages of a closed body may be obtained with an open body.

The accompanying drawings illustrate our invention in several forms: Fig. 1 is a partial side elevation, from the inside, of a touring car equipped with side curtains of our invention; Fig. 2 is a horizontal section substantially on the line 2—2 of Fig. 1; Fig. 3 is a partial perspective of the car shown in Fig. 1, with the doors closed, viewed obliquely from the front; Fig. 4 is a perspective view of the same car, with the doors open, viewed obliquely from the rear; Fig. 5 is an enlarged fragmental vertical section substantially on the line 5—5 of Fig. 1; Fig. 6 is an enlarged fragmental perspective view of the lintel and its adjusting joint, with its fabric for joining with the top; Fig. 7 is an enlarged fragmental horizontal section substantially on the line 7—7 of Fig. 4 with the door closed; Fig. 8 is an enlarged fragmental vertical section on the line 8—8 of Fig. 1; Fig. 9 is a perspective view of the wooden frame used in the curtain sections over the doors in Figs. 1 and 2; Fig. 10 is an enlarged fragmental vertical section substantially on the line 10—10 of Fig. 1; Fig. 11 is an enlarged fragmental horizontal section substantially on the line 11—11 of Fig. 1; Fig. 12 is a fragmental horizontal sectional view on the level of the windshield trunnion on the front right-hand corner of the car shown in Fig. 4; Fig. 13 is an enlarged fragmental horizontal section somewhat similar to the right-hand end of Fig. 7, but showing a slightly modified construction; Fig. 14 is another fragmental horizontal section somewhat similar to Fig. 7, showing a further modification, particularly of the glass-holding means; Fig. 15 is a fragmental perspective view, with the several layers partially rolled apart, showing substantially the same thing as the left-hand part of the full lines of Fig. 7, but with a fabric covering for the channel edge-binding; Fig. 16 is an enlarged horizontal section substantially on a line corresponding to the line 16—16 of Fig. 3, but showing a modified construction; Fig. 17 is a vertical perspective view on a somewhat smaller scale of the parts shown in the lower left-hand corner of Fig. 16; Fig. 18 is a plan on a somewhat smaller scale of the parts shown in the lower left-hand corner of Fig. 16, but indicating the association of the side-curtain structure with a different windshield mounting; Fig. 19 is a fragmental horizontal section corresponding to the right-hand half of Fig. 16, but showing a further modification; Fig. 20 is a view somewhat similar to Fig. 19, showing a still further modification, especially adapted for use where there is only one thickness of glass; Fig. 21 is a view similar to Fig. 20, showing another modification; Figs. 22 and 23 are fragmental perspective views corresponding to Fig. 15 but showing modifications; Fig. 24 is a side elevation, with some parts of the covering broken away, of a special top which we prefer to use in place of the ordinary cape top shown in the earlier views; Figs. 25 and 26 are sections on the lines 25—25 and 26—26 of Fig. 24; Fig. 27 is an enlargement of the right-hand part of Fig. 25, with the covering in place and shown in detail; Fig. 28 is a vertical section of a door-section of the side curtain as preferably made to co-operate with the special top of Figs. 24 to 27 inclusive; and Fig. 29 is a fragmental perspective view of the upper end of the upright shown in section in Fig. 26, with part of the fabric cover broken away.

We have illustrated our invention in connection with a standard touring-car body, having the usual front seat 25 and rear seat 26, and with two doors 27 on each side; but our invention is not limited to this type of automobile body, with front and rear seats and two doors on a side, but is equally applicable to other types of open-car bodies. These bodies usually have cape tops 28, carried by a collapsible framework including side bows 29 and longitudinally extending side members 30 suitably hinged together, the details of the construction of which are not part of our invention and may be anything desired; the front bow when the cape top is raised being suitably attached, as by clamps 31, to the upper ends of the uprights 32 of the windshield 33. Beside the doors 27, there are suitable fixed sections 34 of the sides of the car-body, to some of which fixed sections 34 the doors 27 are hinged. In the car shown, the forward edges of the doors are the hinged edges.

We have shown the application of our side curtains first in connection with such a cape top as is ordinarily used, and later in connection with a special non-collapsible top which we prefer and which forms part of our invention.

Preferably over each door 27, and also over each rear side section 34, we provide a glass-carrying side-curtain, which is formed of two layers of fabric with a suitable interposed frame of stiffer material. The fabric of the side-curtain sections over each door is extended past the line of the hinge-joint 35 of such door, the fabric itself forming the hinge-joints of the side curtain sections. The stiffer material, however, does not extend past the hinge joints. The detail construction of the side-curtains may take various forms, which will be described later.

For forming a lintel for the upper edges of the side-curtain sections on each side to bear against, when the cape top is retained, we provide a longitudinally extending strip 40, which at its front end is provided with a hole through which the trunnion 41 of the upper windshield section 33 projects and is clamped by the regular nut of such trunnion, (see Fig. 12,) and which at its rear end is fastened by a screw or rivet 42 to the side arm of one of the bows 29. If this lintel 40 is too long to be supported wholly by these end supports, it may also be attached to the longitudinal side members 30 of the canopy-frame, as by one or more strips 43 attached by screws or rivets 44 to the lintel 40 and to the side members 30, as is indicated in Fig. 5. These strips 43 are steadying strips, rather than supporting strips, for the lintel 40 is quite rigid in the form in which we have made it. This form contemplates a lintel of sheet-metal, which is folded longitudinally to form a double thickness, with the two thicknesses bent at right angles near the folded edge so that the whole forms a substantially L-shaped structure (Fig. 10); and it preferably has the raw edges of the metal turned in between the two thicknesses to make smooth exposed edges instead. The stem of this L-shaped structure is vertical, and forms the lintel against which the edges of the side-curtain sections abut; and the foot of the L at the folded edge projects inward away from the side-curtain section and serves to stiffen the lintel. This lintel 40 extends directly from the top edge of the windshield upright 32 to the proper bow 29, in general lying substantially directly over and conforming to the shape of the top line of the side of the car body; as such top line is now generally substantially straight, this lintel is also usually substantially straight. As a result, the lintel 40 does not follow the edge of the canopy top, as is clear from Figs. 2 and 3, for at the front such top is usually wider than the body. Each lintel 40 is preferably made adjustable in length, and is formed in overlapping sections, one telescoping within another as is shown in Fig. 6, with the two parts separable for shipping and clamped together by a clamping bolt 45, which passes through holes in such overlapping sections, at least one of these holes being elongated to constitute a slot permitting the adjustment.

To close the space between the top of the lintel 40 and the cape top, when that is used, we clamp between the two thicknesses of the sheet-metal of such lintel one edge of a strip of fabric 46, which fabric extends outward from the upper edge of the lintel, as is shown in Figs. 5 and 10, then beneath the longitudinal side-members 30 of the canopy-frame, and then upward just beneath the covering fabric of the cape top 28 between such covering fabric and the usual shaping pad 47 which lies within the curved part of such top fabric to form the rounded part conforming to the curve of the bow. The upper edge of the strip of fabric 46 preferably extends slightly beyond the upper edge of the pad 47, as is clear from Fig. 5; and though ordinarily the friction of this fabric between the top fabric and the pad 47 is sufficient to hold the strip in place, we prefer to ensure that the strip 46 will not be pulled out by providing its upper edge with a casing 48 through which extends a cord 49 which may be attached to the front and rear bows 29 of the canopy frame.

As we have already stated, the detail structure of the side-curtain construction may take various forms. In the construction shown in Figs. 7, 8, 9, and 10, there are rabbeted wooden strips 50 arranged around the four edges of the glass 51, with the glass-edges seated in the rabbet. If there is only one thickness of glass, as is shown over the rear door 27 and over the rear fixed side-section 34, such glass may be held rigidly in place by a suitable clamping strip 52 which is also seated in the rabbet and is held in place by tacks 53; this clamping strip is preferably covered with a strip of fabric. If there are overlapping glass sections, as when one section is mounted to slide horizontally over the other, as shown over the front door in Fig. 1, two opposite strips of the clamping strips 52, such as the upper and lower ones, may be replaced (see Fig. 10) by sheet-metal channels 54, which are also tacked to the wooden strips 50 or otherwise suitably held thereto. The sliding section 51 of the glass has its upper and lower edges mounted in the channels 54, which thus not only serve as channels for the sliding section of glass but also as clamping members for the other or fixed section of glass. When there is a sliding section of glass, it may be provided at one edge with a suitable handle 55, by which it may be slid along the channels 54. To prevent rattling of the sliding section, we prefer to line the channels 54 with a fabric strip 56, of felt or other soft material, so that the glass will be held firmly without rattling while still being permitted to slide.

The wooden strips 50, when they are used, may if desired form a complete frame, as is shown in Fig. 9; and the upper and lower strips may be extended horizontally beyond one of the vertical strips—the one nearest the free edge of the door when the frame is over a door—to form upward and lower fingers 57 which stiffen the free edge of the door-curtain, where such curtain overlaps an edge of an adjacent curtain section over a fixed body-section 34, as is clear from Figs. 7 and 9.

If any strip 50 is substantially at the edge of the curtain-section, as we prefer to have it along the top edge of the curtain-section as is shown in Fig. 10, it may itself constitute the stiffener for such edge; as appears from Fig. 10. However, if the strip 50 is removed from the edge of the curtain section, as we usually find it convenient to have it at both side edges and at the bottom edge, we provide additional stiffeners. In the structure shown in Figs. 7, 8, and 13, these stiffeners may be formed of strips 60 and 61 of some artificial board structure, such as jute board or rag board, which strips 60 and 61 overlap the outer and inner faces of the wooden strips 50 and extend therefrom to the edge of the curtain section, either laterally as shown in Fig. 7 or downward as shown in Fig. 8.

Where a stiffener strip 60 overlaps a wooden strip 50, it may extend completely over the face of such strip, as is shown in Fig. 13, or it may be set in a suitable rabbet in the face of such wooden strip so that its surface is flush with such surface, as is shown in Figs. 7 and 8. The strips 60 and 61 need not be continuous around the various edges where they are used in the curtain section, though we prefer to have them so.

The stiffener strips 60 and 61 at their edges remote from the wooden strips 50 come close together, as is clear from Figs. 7 and 8; and are held together by a metal channel 62 into which the edges of such strips are received. The metal of this channel 62 may be exposed as shown in Figs. 7 and 8, or the channel may be covered with suitable fabric 63 to conform to the rest of the curtain section and leave no exposed metal parts, as is shown in Fig. 15.

Between the wooden strip 50 and the channel 62, the stiffener strips 60 and 61 may take various forms, as desired. When such stiffener strips project toward the free vertical edge of the curtain-section, they follow the shape of the fingers 57, as is clear from Fig. 7. When they project downward, however, the strip 61 may be bent around the edge face of the wooden strip 50 to form a shoulder which fits upon the upper edge of the door 27 or side section 34, as is clear from Fig. 8, in which case the two strips 60 and 61 project downward in substantially parallel relation over the upper part of the outer face of such door or fixed side-section. This furnishes a convenient means for attaching the lower edges of the curtain section to the automobile-body, as by screws 67.

The strips 50, 60, and 61 are all part of the structural framework, and are not exposed. They are covered by a layer of fabric 64, of any desired character; which usually has its opposite surfaces of different color, as is the regular custom in automobile-top material. The fabric 64 for the entire inner covering of one curtain-section is preferably of one piece, to avoid seams, and so is that for the entire outer covering of a curtain-section. Such layer of covering fabric is cut first so that it is slightly larger than the entire curtain-section, with a hole in it slightly smaller than the exposed surface of the glass. The layer of fabric is put over the stiffening strips 60 and 61 and wooden strips 50, before the glass 51 or channels 54 are in place. At the window opening, the edges of the fabric are turned inward to lie in the glass-receiving rabbet of the strip 50, so that the two fabric cover-strips overlap in such rabbet, as is shown in Figs. 7, 8, 10, and 13. Then the glass 51 is put in place, with its clamping strips 52, and with the channels 54 if they are used. This firmly binds the edges of the covering material within the window opening.

At the opposite edges of the stiffening strips 60 and 61, one cover layer 64 has its edge folded around the edge of the adjacent stiffening strip, say 61, and received between the edge portions of the two stiffening strips 60 and 61; while the other covering layer 64 has its edge folded around the edges of both such stiffening strips 60 and 61, and around the folded part of the first cover layer 64, this whole composite edge structure then being received and clamped tightly by the channel 62. The two cover layers 64 will usually have different faces exposed, as to make the inside surface light and the outside surface dark.

Slight modifications of this edge-binding arrangement are shown in Figs. 22 and 23. Here only one stiffening strip 60ª is shown, as shown being made of three-ply veneering. The two fabric layers 64 and the padding 65 are unchanged, and lie snugly against the faces of the stiffening strip 60ª. One layer of fabric is shown as coming only about to the edge of the stiffening strip, there being held down by a tack 68. The edge of the other layer of fabric is shown as folded around the edge of the stiffening strip 60ª and over a re-inforcing channel 62ª or 62ᵇ, and inward along one inside face of such re-inforcing channel. The re-inforcing channel 62ª (Fig. 22) embraces the stiffening strip 60ª, as well as the free edges of both fabric layers 64; and is put in place by having one leg fastened to the stiffening strip 60ª by tacks 69, after which the other leg is bent from the dotted-line position to the full-line position of Fig. 22 to cover the tacks 68 and the raw edges of the fabric 64 and to clamp the edges of the fabric firmly in place after which the channel may be fastened by tacks 68′ or the inherent stiffness of the material of the channel member may be relied on to hold it in place. The re-inforcing channel 62ᵇ (Fig. 23) does not embrace the stiffening strip 60ª, but only the free edges of both fabric layers 64, and lies wholly on one side of the re-inforcing strip; and it is put in place by having one leg fastened to the stiffening strip 60ª by the same tacks 68 which hold down the edge of one fabric layer 64, after which the other leg is bent down from the position shown in Fig. 3 to lie tightly against the other leg to cover the tacks 68 and the raw edges of the fabric 64 and to clamp the edges of the fabric firmly in place.

Where the wooden strip 50 is directly at the edge of the curtain-section, as is shown in Fig. 10, one of the cover layers, say that on the outside, is folded tight around such wooden strip from the glass-receiving rabbet over the outer surface of the strip and then over the strip-edge and then inward along the inner surface of the strip; but to get the proper color on the inner face of the completed curtain-section, the cover layer on the inside is merely folded on itself to overlie the inner face of such wooden strip 50; as is clear from Fig. 10. Since the strip 64 on the inside abuts against the lintel 40 at the top of the curtain-section, I preferably provide a padding 65 between the two layers of such fabric where it is folded over on itself, as is clear from Fig. 10, to provide an anti-rattling cushion to abut against the lintel.

To permit this folding of the fabric 64 in these various places, it may be suitably slashed, especially at the various corners, as is well understood in the fitting of fabric. Similar layers of padding 66 may be provided beneath the fabric 64 wherever desired, especially beneath that which covers the outer surface, to provide a smooth unwrinkled surface. Such padding 66 may extend from one edge of the glass-receiving rabbet over the face of the wooden strip 50 and stiffening strip 60 into the channel 62, and preferably extends completely around the upper edge of the topmost wooden strip 50, as is indicated by the heavy black lines in Figs. 7, 8, 10, 13, and 15.

The side-curtain sections are rigidly held at the lower edges by the screws 67, by which they are attached to the doors 27 or fixed side sections 34 of the body. The curtain-sections over the doors 27 are supported at the side edges, preferably close to the edges of the glass, by the usual rods 70, which are removably carried by the doors and move therewith and project upward from such doors and are received in suitable pockets 71 provided by folds of the fabric, preferably overlying the vertical wooden strips 50 and attached thereto so that the support for the glass will be relatively rigid. The curtain-sections over the fixed side-sections 34 of the body are also supported at the lower part by screws 67 and at the upper parts by being attached to the lintel 40 by suitable screws or other fasteners; and the curtain section over the rear side-section 34 may also be attached by suitable fasteners to the adjacent bows 29 of the top, by any convenient fasteners.

The front edge of the front curtain-section preferably overlies the windshield upright 32, and is folded around its forward surface; it may be simply attached thereto by suitable fasteners 73, which are preferably of some suitable quick-releasable type. The two fabric layers 64 where they overlie the windshield upright 32 are suitably stitched together, with the raw edge of one received in the hem of the other, as is clear from Fig. 11.

The fixed side-section 34 between the two doors 27 is usually so narrow that only a single vertical stiffening strip 74 is necessary, as is clear from Fig. 2, and over this stiffening strip the fabric layers 64 may be folded substantially as they are over the top wooden strip 50 shown in Fig. 10. The stiffening strip 74 is fastened at the bottom by one or more screws 67 to the side section 34, and suitably fastened at the top to the lintel 40. The fabric 64 of the curtain sections over the doors 27 extends past the hinge-line of such doors to the curtain-section over the fixed side-section 34 to which such door is hinged, and passes around either the stiffening strip 74 or overlaps the windshield upright 32, as is clear from Fig. 2. The hinge line 35 is crossed by the fabric, which bends to form the hinging, but no stiffeners such as the fingers 57 or the stiffening strips 60 and 61 extend across such hinge-line.

Our invention is subject to considerable modification. We show one modification in Fig. 14, in regard to the mounting of the glass. In the structure shown in Fig. 14, there are the same stiffening strips 60 and 61, the same fabric coverings 64, and the same edge-binding channel 62 arranged to bind the edges of the fabric 64 over the edges of the stiffening strips 60 and 61 as already explained. In place of mounting the edge of the glass 51 in wooden strips 50, we may use a sheet-metal glass-support formed of two opposed sheet-metal plates 75 which bear against each other at their edges remote from the glass 51, and which at their edges overlapping the glass 51 are provided with grooved portions 76 facing each other and the glass 51 and carrying suitable padding 77, such as rubber tubing, which bears against the glass 51. The two plates 75 are clamped together by clamping screws 78. This form of glass-support 75—76—77—78 is not new, per se, but it is well adapted for use in our invention. The stiffening strips 60 and 61 at their inner edges are received in the exterior angles of the plates 75 where the bodies of such plates join the grooves 76, and may be fastened to such plates by rivets 79. Thus in the structure shown in Fig. 14, as well as in that already described, the two stiffening strips 60 and 61 flare apart as they approach the glass, to receive a glass-carrying member between them; but come together at their outer edges to be received in the channel 62. When the glass-clamping member of Fig. 14 is used, the fabric 64 may be folded around the grooved portions 76, and folded in such grooves between the inner surfaces thereof and the rubber tubing 77. With this arrangement of parts, the fabric 64 does not lie tight against the stiffener strips 60 and 61, especially near the glass; but this is not visible from the exterior. If desired, suitable padding 80 between the stiffener strips 60 and the outer covering of fabric 64 may be used, as illustrated for one fabric covering.

With the construction so far shown, it is sometimes desirable to use sheet-metal reinforcing strips, especially at the lower or supporting portion. We show such a sheet-metal reinforcing strip 81 in Fig. 8, where it extends down from the wooden strip 50 between the two stiffening strips 60 and 61, so that the screws 67 which attach the curtain-section to the door 27 pass through such reinforcing strip. This re-inforcing strip 81 may, like the stiffening strip 60 or 61, be received in a rabbet in the wooden strip 50, if that is desired; and for further supporting action, it may be attached to the wooden strip 50 by screws 82.

If desired, instead of the two reinforcing strips 60 and 61 of jute board or similar flexible material, with or without a sheet-metal reinforcing strip 81, we may use a single strip 83 as shown in Figs. 16, 19, 20, and 21. In this case, we show the strip 83 of sheet-metal, rather than of jute board or similar material, and locate it beneath the outer layer of covering fabric 64, preferably with interposed padding 66. This stiffening-reinforcing strip 83 may project outward from any or all edges of the glass 51. At such glass 51, the stiffening-reinforcing strip 83 may be associated (Fig. 21) with a wooden strip 50, in much the same manner as the structure shown in Figs. 7, 8, and 13; in which case, for the sake of appearance, we prefer to make the strip 50 in the nature of a quarter-round to avoid any sharp corner where the inner fabric-layer 64 joins it, though this is a mere matter of preference and not essential.

Instead of co-operating with a rabbeted wooden strip 50, as in Fig. 21, the stiffening reinforcing strip 83 may extend inward to overlap the glass 51, as is shown in Figs. 16, 19, and 20, in which case we prefer to make the overlapping edge of such stiffening reinforcing strip in the form of a half-round channel 84, around and within which the inner edge of the covering fabric 64 is laid. The other face of the glass may be gripped at the edge by a narrow metal strip 85, attached to the stiffening reinforcing strip 83 by suitable attaching devices, such as the screws and sockets 86, shown in Fig. 20; or the screws and nuts 87 shown in Fig. 19. In this case, the strip 85 may be separated from the stiffening reinforcing strip 83 by a suitable filler strip 88, conveniently made of a strip of rag board.

Instead of the flat strip 85, with the filler strip 88, we may provide a Z-shaped strip 89, as shown in Fig. 19, which by reason of its bends bears directly against the stiffening reinforcing strip 83 without any filler strip, and is fastened thereto by the screws and nuts 87, with a sufficient offsetting to provide a space for the glass 51 between its inner edge and the channel 84; with a layer of rubber or other padding 90 around the glass at the edge to prevent rattling.

Where there are two layers of glass 51, we can readily provide sliding channels therefor, as in the arrangements shown in Figs. 16 and 19. In the arrangement shown in Fig. 19, there is a second Z-shaped member 91, corresponding in general to the Z-shaped member 89 but with a greater offsetting between its two edges. Near one edge, this second Z-shaped member 91 bears directly against one flange of the Z-shaped member 89, and with the latter is clamped to the stiffening re-inforcing strip 83 by the screws and nuts 87; whereas the other flange of such member 91 co-operates with the corresponding flange of the Z-shaped member 89 to provide between them a channel for a second layer of glass 51; either of the layers of glass being slidable. We prefer to provide suitable padding 90 for the edges of the second layer of glass also.

Instead of the two Z-shaped members 89 and 90, we may provide a single channel member 92, which receives between its legs the edge of the second layer of glass 51, as is clear from Fig. 16; with a suitable filler strip 93 within such channel at its bottom, and with a second filler strip 94 separating the channel as a whole from the stiffening reinforcing strip 83, to form the space for the first layer of glass. That is, the channel 92 is substituted for the flat strip 85 of Fig. 20 when there is a second layer of glass. The channel 92, filler strips 93 and 94, and stiffening reinforcing strip 83 are all attached together by suitable attaching means, such as screws and sockets 86.

When the stiffening and reinforcing strip 83 of metal is used, we may dispense with the channel 62 at the edge, and may provide a binder construction which is adaptable for use either at an edge or at an intermediate point, as for instance on the two sides of a hinge line as is indicated in Fig. 16. Thus at the edge of the sheet-metal stiffening and reinforcing strip 83 from the channel 84 we bend the sheet-metal into an open rib 95, forming nearly but not quite a complete circle. Into this open rib we force folds or an edge of the fabric 64, preferably by means of a wire 96 which is sprung into such open rib and which is preferably enfolded in at least one of the folds of the fabric. The folds of the fabric may be at an intermediate point in the width of the fabric, as indicated in Fig. 16 just to the right of the hinge line 35, both layers of fabric 64 from the curtain-section over the door passing into such open rib 95, and at least one of them passing around the wire 96, and then both layers of fabric coming back out of the open rib and extending past the hinge line 35 to some suitable fastening means on the other side of such hinge line.

Such fastening means may be formed by another strip of sheet-metal 97, with open ribs 95 at each end, and with a wire 96 in each such rib; and one or both layers of the fabric 64 may be placed either at intermediate points or at edges thereof in either or both of such open ribs 95, as indicated at the left-hand end of Fig. 16. The sheet-metal strip 97 may take various forms, as for instance to fit around the corner of the windshield upright 32; and may conform in general to such windshield upright, as with the smooth-curved bend of Fig. 16 or the almost right-angle bend of Fig. 18. Preferably a layer of padding 98 is placed between the sheet-metal strip 97 and the outer layer of fabric 64, to give smoothness and softness of surface, but this is not essential. The fabric is firmly held in the various ribs 95, three of which are shown in Fig. 16, by the clamping action of such open ribs and their co-operating wires 96, and when once in place are not easily withdrawn. To make this clamping more secure, the open ribs 95 may be crimped more tightly after the wires 96 and layers of fabric are in place therein.

The side-curtain construction so far described has been designed with a view to capability of use with the ordinary cape top or canopy top, as well as with our special top; so that although a special top can be used, it will not be necessary to do so.

However, especially when our construction is used directly at the factory, we prefer to provide a special top. It is becoming more and more customary not to collapse a top, even when the tops are collapsible; so that it is perfectly feasible with most cars to have a non-collapsible top. We show such a top in Figs. 24, 25, 26, and 27, and can use therewith any of the side-curtain constructions so far described; but in Fig. 28 we show the construction which we consider as the preferred structure when the special top of Figs. 24 to 27 is used.

In this special top, there is a rear obliquely set bow 101, as is clear from Fig. 24. We preferably fasten this permanently to the rear fixed side section 34 of the car body, as by suitable fittings 102. Extending forward from this obliquely set rear bow 101 are two side members 103 which constitute the lower bar of the top structure and are not collapsible. These side members 103 may be interconnected at any desired number of intermediate points, by short-legged bows 104, of any suitable shape to give the desired shape to the top, usually with rounded corners. Longitudinally extending slats 105 are mounted on these bows 101 and 104, and extend from front to rear of the top; but they do not necessarily do so over the entire length of the bows, but only over the corners which the bows form, to provide for keeping the fabric of the top with smooth curves. Preferably, in order to avoid squeaking a layer of fabric 106 is placed beneath the slats 105, between them and the bows 101 and 104, as is clear from Figs. 25 and 27. Another layer of fabric 106 may be placed over the outside of the slats 105, throughout their length, as is clear from Fig. 24, and over this outer fabric layer 106 on the outside of such slats may be stretched the fabric or leather 107 which is to form the outer surface of the top. Preferably, especially over the slats 105, a layer of padding 108 is interposed beneath the outer layer 107 of fabric, to make a smooth soft curved surface, without wrinkles.

At the rear of the car body, a suitable window 110 may be located, mounted in a frame 111; which frame is conveniently of wood veneer. This frame is attached by suitable stiffening members 112, conveniently of triangular shape and located one at each corner of the frame, to the back 113 of the car body and to the top part of the rear bow 101. The back of the top may be closed by a suitable fabric, set around the rear from one leg of the bow 101 to the other, with a suitable opening for the window 110, and with the fabric arranged at the frame 111 in any of the ways already described. Usually there will be two layers of fabric, one on the inside and one on the outside, with the window frame 111 located between such two layers, in a manner which is evident from the structure already explained for the side curtain.

For open driving, there need be nothing between the rear bow 101 and the windshield 33. For winter driving, or closed-car driving, side curtains will be mounted in the open spaces at the sides, to close such spaces. This may include one or more fixed uprights, such as the upright 115 shown between the front and rear doors 27. A cross-section of such an upright is shown in Fig. 26, and a perspective of its upper end in Fig. 29. As thus shown, for illustration, this upright has two wooden strips 116 and 117, the strip 116 being toward the outside and being narrower than the strip 117 so that the latter will provide a shoulder for the swinging side curtain over the door 27 in front thereof to abut against. A strip of fabric 118 is wrapped around the wooden strip 116, with its edges fastened by tacks 119 to such strip where such edges project between the two strips. This fabric strip 118 has the surface exposed which corresponds to the outer surface of the fabric of the cover and side curtains. Similar strips of fabric 120 and 120ª overlie the edges of the strip 117, and are tacked thereto by tacks 121; and these strips have the surface exposed which corresponds to the surface of the inside of the cover and side curtains. While the two fabric strips 120 and 120ª may be continuous, we prefer to make them separate, with one edge of the fabric strip 120 laid over the face of the wooden strip 117 and around a thin strip 122 of leather or board or similar substance. The two wooden strips 116 and 117 are attached together by screws 123 near their ends. A layer of padding 66 may lie beneath the fabric 118. An upwardly projecting anchor plate 124 of sheet metal is preferably attached to the upper end of this upright, to furnish means for attaching it to the longitudinal 103; which anchor plate may if desired be covered with the fabric 120, though the fabric is broken away in Fig. 29 to show the anchor plate better. The lower end of the upright overlaps a fixed section 34 of the car body and is attached thereto by screws 67.

Extending from the upright 115 are two layers of fabric 64, such as already have been described, which layers constitute the inner and outer surface-layers of the side-curtain section. The edges of the fabric layers 64 are attached in place by the tacks 119 and 121, so that the raw edges of such fabrics are concealed between the covered wooden strips 116 and 117. These two layers of fabric 64 project for a distance from the upright 115 without any stiffeners interposed, to provide the hinge joints 35 already referred to. After crossing such hinge joints, they may be laid over any of the frame-constructions which have already been described.

With the top construction shown in Figs. 24 to 27 inclusive, however, we prefer that these fabric layers 64 extend on to the glass-carrying frame-construction shown in Fig. 28. Here there is a stiffener formed preferably of a single piece of wood veneering 126, shown as three-ply veneering, the outside of which conforms in shape to the desired side curtain section which is carried by the door 27. This veneering 126 has an opening cut in it for the window, which opening is slightly smaller than the glass 51 which it receives, so that it will form a shoulder for such glass to rest in. Four strips 127 of wood or leather are fixed to the side of the veneering 126, around the window opening, at a suitable distance therefrom, to permit the glass 51 to be received within such strips 127. The two fabric layers 64 are laid around the strips 127 and the edges formed by the window opening in the veneering 126, to overlap on the inner faces of such strip 127 between them and the edge of the glass 51, as is clear from Fig. 28, and then the glass 51 is set in place over the exposed fabric layer 64. The glass may be held in place by tacked-on strips 129, tacked to the inner faces of the strips 127; and these strips 129, which are preferably of leather, are covered with fabric with the desired surface exposed.

The fabric layer 64 at the outer edges of the veneering 126 is held by tacks 130, projecting through the folded-over edge of one of such fabric layers 64, which folded-over edge is of the layer which extends around the edge of the veneering 126 and overlies the raw edge of the other fabric layer. If desired, this folded-over edge of the fabric may enclose nothing within it, as is indicated at the bottom of Fig. 28; but at the top of this side-curtain section, we preferably provide that a soft strip 131, as of leather, will be enclosed in this folded-over part, with the tacks concealed as shown, to provide a resilient bumper for bearing against the lintel of the door. The same construction may be provided, and preferably is provided, at the free vertical edge of the side-curtain section over the door, where such edge abuts against the shoulder formed by the projection of the wooden strip.

The lintel of the door may be provided by the structure shown in detail in Fig. 6, and already described. With the permanent and special top construction shown in Figs. 24 to 27 inclusive, however, we prefer to provide a clamping and bracing lintel as shown in Fig. 27. Here there is a folded sheet-metal strip 135, having a horizontal flange attached to the under face of the longitudinal bar 103 by screws 136, and a vertical flange which projects upward along the inside face of such longitudinal bar 103 and is preferably attached thereto by screws 136$^a$. Between these two flanges, this lintel has two downwardly projecting parallel folds, against one of which the buffer strip 131 may strike. These two folds form between them a narrow slit 138 which receives and firmly clamps the lower edge of the inner strip 137 of fabric which lies within and conceals the wooden frame-work of the special top. This inner layer of fabric 137 overlies the vertical flange of the lintel 135, and its lower edge is folded over and projects upward into such slit 138.

The lintel 135 furnishes a convenient means, also, for concealing the lower edge of the outer layer of fabric 107, and the tacks which hold it. For this, such edge is preferably laid beneath the horizontal flange of such lintel. Preferably, this outer layer of fabric 107 extends around the lower end of a metal drip strip 139 which is attached to the outer face of the longitudinal 103 and projects downward beyond the lower face thereof to provide a water-drip offset around which the fabric 107 extends, as is clear from Fig. 27. The fabric 107 is held tight around the drip strip by the horizontal flange of the lintel strip 135.

The top construction shown in Figs. 24 to 27, in combination with the side curtains, furnishes a substantial closed top, which may be used with open cars to make therefrom the substantial equivalent of a closed car. This top structure, however, is relatively cheap, in comparison either with the regular closed body, or in comparison with the so-called "California top". It may be made in any trimming factory, without any great equipment. The side-curtain sections, including the uprights 115, may be attached to corresponding parts of the side of the car body, as by screws already described; and when not in use, they are taken off and put away by simply removing such screws, to make a completely open-sided car.

Thus the equivalent of both an open car and a closed car may be obtained at very slight expense.

We claim as our invention:—

1. In a side curtain for automobiles the combination of a glass-engaging structure for receiving the edge of the glass of a window, two stiffening strips cooperating with said glass-engaging structure and projecting therefrom oppositely from the glass, the outer edges of said stiffening strips being in proximity, fabric overlying said glass-engaging structure and said stiffening strips, one layer of said fabric being folded around the edge of only one stiffening strip and the other layer of fabric being folded around the edges of both stiffening strips, a metal channel extending around the outer edge of the stiffening strips and fabric folded around such edges and binding them together, substantially as set forth.

2. In an automobile side curtain, the combination of a glass-engaging part, one or more stiffening strips attached to said glass-engaging part and projecting therefrom oppositely from the glass and overlying a body part, fabric material covering said glass-engaging part and stiffening strips on both sides, fabric material between said strips and means passing through said stiffening strips into the body part for attaching them and the side curtain in place on the body part, substantially as set forth.

In witness whereof, we have hereunto set our hands at Connersville, Indiana, this 8th day of June, A. D. one thousand nine hundred and twenty-three.

FREDERICK V. MILLER.
FRANK M. CRAWFORD.